(12) United States Patent
Dou et al.

(10) Patent No.: US 10,479,840 B2
(45) Date of Patent: Nov. 19, 2019

(54) RESISTANT DEXTRIN AND METHOD FOR PREPARING THE SAME

(71) Applicant: SHANDONG BAILONG CHUANGYUAN BIO-TECH CO., LTD, Dezhou (CN)

(72) Inventors: Guangpeng Dou, Dezhou (CN); Zhaobo Gan, Dezhou (CN); Fanghua Li, Dezhou (CN); Xianbao Shao, Dezhou (CN); Tengteng Yang, Dezhou (CN); Qian Du, Dezhou (CN); Mingzhan Zhang, Dezhou (CN); Xingjing Zhang, Dezhou (CN)

(73) Assignee: SHANDONG BAILONG CHUANGYUAN BIO-TECH CO., LTD, Dezhou (CN)

( * ) Notice: Subject to any disclaimer, the term of this patent is extended or adjusted under 35 U.S.C. 154(b) by 0 days.

(21) Appl. No.: 15/566,234

(22) PCT Filed: Jan. 17, 2017

(86) PCT No.: PCT/CN2017/071337
§ 371 (c)(1),
(2) Date: Oct. 13, 2017

(87) PCT Pub. No.: WO2017/128984
PCT Pub. Date: Aug. 3, 2017

(65) Prior Publication Data
US 2018/0094082 A1     Apr. 5, 2018

(30) Foreign Application Priority Data
Jan. 27, 2016  (CN) .......................... 2016 1 0055348

(51) Int. Cl.
| C08B 30/18 | (2006.01) |
| A23L 29/30 | (2016.01) |
| A23L 33/26 | (2016.01) |
| B01D 15/18 | (2006.01) |
| B01D 15/36 | (2006.01) |

(52) U.S. Cl.
CPC .............. *C08B 30/18* (2013.01); *A23L 29/30* (2016.08); *A23L 33/26* (2016.08); *B01D 15/1871* (2013.01); *B01D 15/361* (2013.01); *A23V 2002/00* (2013.01)

(58) Field of Classification Search
CPC .......... C08B 30/18; A23L 29/30; A23L 33/26; B01D 15/361; B01D 15/1871; A23V 2002/00
USPC ......................................................... 536/46
See application file for complete search history.

(56) References Cited

U.S. PATENT DOCUMENTS

| 3,607,395 | A | * | 9/1971 | Stephenson ............ C08B 30/18 |
| | | | | 127/29 |
| 5,364,652 | A | † | 11/1994 | Ohkuma |
| 5,430,141 | A | † | 7/1995 | Ohkuma |
| 2009/0196975 | A1 | † | 8/2009 | Inoue |
| 2013/0030167 | A1 | † | 1/2013 | Wang |
| 2015/0025037 | A1 | † | 1/2015 | Bureau |
| 2018/0094082 | A1 | | 4/2018 | Dou et al. |

FOREIGN PATENT DOCUMENTS

| CN | 104403009 | A | * | 3/2015 |
| CN | 105542019 | A | | 5/2016 |
| JP | H09278802 | A | † | 10/1997 |
| JP | 2005-263867 | A | † | 9/2005 |
| WO | 2014/145276 | A1 | † | 9/2014 |

OTHER PUBLICATIONS

Allihn (Journal fuer Praktische Chemie (Leipzig), 22, 46-97, From: J. Chem. Soc., Abstr. 40, 149 1881) (Abstract sent).*
Xu et al.; CN 104403009 A; Mar. 11, 2015 ( Machine-English Translation).*
Extended European Search Report from European Application No. 17743599.7, dated May 29, 2019.
Yin, Yueling et al.: "Research progress and market status of resistant dextrin", Fine and Special Ty Chemicals, vol. 20, No. 12, Dec. 31, 2012 (Dec. 31, 2012), p. 35, XP009508897.
GB/T 5009.88-2008 standard, published 2008.
Megazyme, "Dietary Fiber Measurement Product Guide." dated Oct. 2016.
Allan W. Buck, "Resistant Maltodextrin Overview", pp. 279-291, Dietary Fiber and Health, 2012, CRC Press by Taylor & Francis Group.†
Fibersol-2 Brochure, 2005.†

* cited by examiner
† cited by third party

*Primary Examiner* — Shaojia A Jiang
*Assistant Examiner* — Michael C. Henry
(74) *Attorney, Agent, or Firm* — Merchant & Gould P.C.

(57) ABSTRACT

A resistant dextrin and a method for preparing the same. In the resistant dextrin, molar content of DP1 is smaller than or equal to 1%, molar content of DP2 is smaller than or equal to 4.5%, molar content of DP3 is smaller than or equal to 7.0%, an average degree of polymerization is 6-12, a pH value is 3.0-6.0, and molar content of dietary fibers is greater than or equal to 85%. The present invention further relates to a method for preparing the resistant dextrin. Since the present invention uses starch as the raw material and divides dextrinization reaction into two stages for the first time, the degree of polymerization of the polymerization reaction is reliably guaranteed, the number of caused side reactions is decreased at the same time and the difficulty in subsequent purification treatment is greatly decreased.

12 Claims, No Drawings

RESISTANT DEXTRIN AND METHOD FOR PREPARING THE SAME

This application is the U.S. national phase of International Application No. PCT/CN2017/071337 filed on 17 Jan. 2017 which designated the U.S. and claims priority to Chinese Application Nos. CN201610055348.X filed on 27 Jan. 2016, the entire contents of each of which are hereby incorporated by reference.

FIELD OF THE INVENTION

The present invention relates to a resistant dextrin and a method for preparing the same, and belongs to the technical field of food additive production.

BACKGROUND OF THE INVENTION

With the improvement of the level of people's life, many people suffer from hyperlipidemia, hypertension and hyperglycemia symptoms, which are commonly known as "Triple H" and have a trend of increasingly attacking younger peoples. WHO (World Health Organization) ever clearly pointed out that a first defense line for preventing and treating cardiovascular diseases is to decrease "Triple H" and control "Triple H". Among people who suffer from "Triple H", except seriously ill people who need to be treated under the cooperation of drugs, the health of most people may be conditioned by means such as dietary therapy such that side effects of drugs can be avoided.

Dietary fibers are a kind of carbohydrates which cannot be digested by human bodies, including two major types, i.e., non-water-soluble fibers and water-soluble fibers. In the "Twelfth Five-Year Plan" of China, it is advocated to develop application of dietary fibers, so as to restrain potential hazards caused to people. Daily intakes of dietary fibers which are recommended by relevant international organizations are as follows: a standard recommended by American Cancer Society is 30-40 g/person/day, a standard recommended by European Scientific Committee on Food is 30 g/person/day, and a standard recommended by Chinese Nutrition Society is 25-35 g/person/day.

Resistant dextrin is a kind of low-calorie glucan. As compared with other dietary fiber products, resistant dextrin in low-molecule water-soluble dietary fibers prepared by using natural starch as a raw material has excellent features such as of good acidic and thermal stability, high digestion tolerance, low glycemic index, low insulin index, low calorie and tooth decay prevention.

Chinese patent literature CN104403009A (Application No. 201410671093.0) discloses a method for preparing resistant dextrin, comprising the following steps: performing pyrolytic reaction under a high-temperature condition by using starch after acidic treatment as a raw material and adopting sea sand as a heat transfer medium to obtain a pyrodextrin crude product, and then performing refining treatment to the pyrodextrin crude product to obtain a resistant dextrin product.

Chinese patent literature CN103725732A (Application No. 201310743226.6) discloses a method for preparing resistant dextrin by comprehensively utilizing C-type wheat starch, comprising the following steps: using C-type wheat starch paste as a raw material, regulating pH by using hydrochloric acid and then performing acidification in a closed environment; (2) centrifuging the acidified starch paste and then performing drying; (3) performing high-temperature pyrolysis in a roller heating furnace; (4) cooling to room temperature, adding a proper amount of distilled water and preparing emulsion liquid within a certain concentration range; (5) synchronously performing liquefaction and saccharification by adopting a two-enzymes synergy method; (6) adding activated carbon for discoloration and performing suction filtration to obtain sample liquid; and (7) performing alcohol precipitation and centrifugation to the feed liquid, distilling supernatant, recycling alcohol and performing air flow drying to precipitate to obtain resistant dextrin with a content of 85-90%, wherein the product yield is 80-90%.

The above-mentioned preparation methods still have the disadvantages such as of great product bitterness, deliquescence and poor flowability, cannot be widely applied to food and healthcare products, especially the field of high-grade food and healthcare products.

SUMMARY OF THE INVENTION

Aiming at the defects of the prior art, the present invention provides a resistant dextrin and a method for preparing the same. The resistant dextrin prepared by the present invention is not deliquescent, has good taste and flowability and can be widely applied to food and healthcare products, especially the field of high-grade food and healthcare products.

Description of Terms

DP refers to Degree of Polymerization, is an index for measuring the magnitude of a polymer molecule and uses a number of repeated units as a datum, i.e., is an average value of number of repeated units contained in a polymer macromolecule chain.

DP1 refers to a macromolecule with a degree of polymerization which is 1, DP2 refers to a macromolecule with a degree of polymerization which is 2 and DP3 refers to a macromolecule with a degree of polymerization which is 3.

In order to implement the present invention, the present invention adopts the following technical solution:

A resistant dextrin is characterized in that molar content of DP1 is smaller than or equal to 1%, molar content of DP2 is smaller than or equal to 4.5%, molar content of DP3 is smaller than or equal to 7.0%, an average degree of polymerization is 6-12, a pH value is 3.0-6.0 and molar content of dietary fibers is greater than or equal to 85%.

A method for preparing above-mentioned resistant dextrin comprises the following steps:

(1) adding acid solution into starch according to mass percent of 0.1-0.5% and uniformly stirring the mixture to obtain a reaction material;

(2) increasing temperature of the reaction material obtained in step (1) to 80-120° C., performing reaction for 2-4 h at normal pressure to obtain an initial reaction material, then adding acid solution according to mass percent of 1-10% relative to the initial reaction material, uniformly stirring the mixture, increasing temperature to 140-200° C. and performing gelatinization reaction for 15-30 min at normal pressure to obtain a dextrin crude material;

(3) adding deionized water into the dextrin crude material obtained in step (2), regulating sugar concentration to 40-45 wt %, and preserving heat to perform acidic hydrolysis for 1-2 h at 80-100° C. to obtain hydrolysate; and (4) performing discoloration, ion exchange, concentration, purification and drying to the hydrolysate obtained in step (3) to obtain the resistant dextrin.

According to the present invention, preferably, acid in step (1) and step (2) is edible acid; and more preferably, the acid is one or a combination of more than two of citric acid, malic acid, hydrochloric acid, phosphoric acid and sulfuric acid.

According to the present invention, preferably, mass concentration of acid in step (1) and step (2) is 0.08-0.12%.

According to the present invention, preferably, the discoloration in step (4) comprises the following step:

adding activated carbon according to dry-base mass percent of 0.5-1.5%, preserving heat and stirring for 25-35 min, and then performing filtration to obtain feed liquid with light transmittance greater than or equal to 95%.

According to the present invention, preferably, the ion exchange in step (4) comprises the following step:

regulating temperature of feed liquid before entering a column to 35-55° C. and pH of feed liquid exiting the column to 4.0-5.0 to obtain ion exchange liquid with electric conductivity smaller than 100 μs/cm and light transmittance greater than or equal to 98%; and according to the present invention, preferably, the concentration in step (4) is sextuple-effect concentration to solid substance mass content of 50-60%.

According to the present invention, preferably, the purification in step (4) comprises chromatographic purification, secondary discoloration, secondary ion exchange and secondary concentration.

According to the present invention, more preferably, the chromatographic purification comprises regulating pH to 6.0-7.0 and then performing chromatographic purification through a chromatographic separation system, wherein operating conditions for chromatographic separation are as follows: operating pressure: 0.2-0.35 MPa, temperature: 50-70° C., water consumption ratio: 1:(1.2-1.5) and feed per hour: 1.2-1.5 m³.

According to the present invention, more preferably, the secondary discoloration comprises adding activated carbon according to dry-base mass percent of 0.5-1.5%, preserving heat and stirring for 25-35 min and then performing filtration.

According to the present invention, more preferably, the secondary ion exchange comprises the following step:

regulating temperature of feed liquid before entering a column to 35-55° C. and pH of feed liquid exiting the column to 4.0-5.0 to obtain secondary ion exchange liquid with electric conductivity smaller than 100 μs/cm and light transmittance greater than or equal to 98%; and according to the present invention, more preferably, the secondary concentration is sextuple-effect concentration to solid substance mass content of 50-60%, pH of 4.0-5.0, electric conductivity smaller than 100 μs/cm and light transmittance greater than or equal to 98%.

According to the present invention, preferably, the drying in step (4) is belt vacuum drying to water mass content smaller than or equal to 6%.

The above-mentioned raw materials are commercially available products in the field. Unless otherwise specially stated, process steps can be all performed according to common operations in the field.

Beneficial Effects

1. The present invention uses starch as the raw material and divides dextrinization reaction into two stages for the first time, the degree of polymerization of the polymerization reaction is reliably guaranteed, the number of caused side reactions is decreased at the same time and the difficulty in subsequent purification treatment is greatly decreased.

2. The present invention adopts enzyme-free catalytic reaction, i.e., no biological enzyme needs to be added in the entire reaction process, natural hydrolysis is realized in the hydrolysis process by using the acidic environment which exists per se, and by adopting enzyme-free catalytic reaction, on one hand, the reaction process is simplified, and on the other hand, the production cost is greatly reduced and the difficulty in subsequent purification treatment is decreased.

3. The present invention overcomes the disadvantages such as of much side reaction in the original process, great product bitterness, deliquescence and poor flowability, the molar content of DP1 of the prepared resistant dextrin is smaller than or equal to 1%, the molar content of DP2 of the prepared resistant dextrin is smaller than or equal to 4.5%, the molar content of DP3 of the prepared resistant dextrin is smaller than or equal to 7.0%, the average degree of polymerization is 6-12, the pH value is 3.0-6.0 and the molar content of dietary fibers is greater than or equal to 85%, such that the product has good taste and flowability and can be widely applied to food and healthcare products, especially the field of high-grade food and healthcare products.

DESCRIPTION OF THE EMBODIMENTS

The technical solution of the present invention will be further described below in combination with the embodiments. However, the protection scope of the present invention is not limited thereto.

In the embodiments, the starch was purchased from Shandong Fuyang Biotechnology Co., Ltd.; the malic acid was purchased from Nanjing Guohai Bioengineering Co., Ltd; and the citric acid was purchased from TTCA Co., Ltd.

Example 1

A method for preparing a resistant dextrin comprises the following steps:

(1) adding malic acid solution into starch according to mass percent of 0.2% and uniformly stirring the mixture to obtain a reaction material;

(2) increasing temperature of the reaction material obtained in step (1) to 85° C., performing reaction for 2.5 h at normal pressure to obtain an initial reaction material, then adding malic acid solution according to mass percent of 2% relative to the initial reaction material, uniformly stirring the mixture, increasing temperature to 160° C. and performing gelatinization reaction for 20 min at normal pressure to obtain a dextrin crude material;

(3) adding deionized water into the dextrin crude material obtained in step (2), regulating sugar concentration to 41 wt %, and preserving heat to perform acidic hydrolysis for 1.2 h at 85° C. to obtain hydrolysate; and (4) adding activated carbon into the hydrolysate obtained in step (3) according to dry-base mass percent of 0.7%, preserving heat and stirring for 30 min, and then performing filtration to obtain feed liquid with light transmittance of 96%;

then regulating temperature of feed liquid before entering a column to 41° C. and pH of feed liquid exiting the column to 4.2 to obtain ion exchange liquid with electric conductivity of 80 μs/cm and light transmittance of 99%;

then performing sextuple-effect concentration to solid substance mass content of 52%; and performing chromatographic purification, secondary discoloration, secondary ion exchange, secondary concentration and belt vacuum drying to water mass content of 5% to obtain the resistant dextrin.

The chromatographic purification comprisesd regulating pH to 6.5 and then performing chromatographic purification through a chromatographic separation system, wherein operating conditions for chromatographic separation are as follows: operating pressure: 0.2 MPa, temperature: 50-70° C., water consumption ratio: 1:1.2 and feed per hour: 1.2 m$^3$;

the secondary discoloration comprises adding activated carbon according to dry-base mass percent of 0.6%, preserving heat and stirring for 30 min and then performing filtration;

the secondary ion exchange comprises the following step: regulating temperature of feed liquid before entering a column to 39° C. and pH of feed liquid exiting the column to 4.2 to obtain secondary ion exchange liquid with electric conductivity of 90 μs/cm and light transmittance of 99%;

the secondary concentration is sextuple-effect concentration to solid substance mass content of 55%, pH of 4.5, electric conductivity smaller than 80 μs/cm and light transmittance greater than or equal to 99%; and mass concentration of acid in step (1) and step (2) is 0.1%.

As tested, in the prepared resistant dextrin, the molar content of DP1 is 0.3%, the molar content of DP2 is 4.1%, the molar content of DP3 is 6.0%, the average degree of polymerization is 7, the pH value is 5.0 and the molar content of dietary fibers is 88%.

Example 2

A method for preparing a resistant dextrin comprises the following steps:

(1) adding citric acid solution into starch according to mass percent of 0.1% and uniformly stirring the mixture to obtain a reaction material;

(2) increasing temperature of the reaction material obtained in step (1) to 80° C., performing reaction for 2 h at normal pressure to obtain an initial reaction material, then adding citric acid solution according to mass percent of 2% relative to the initial reaction material, uniformly stirring the mixture, increasing temperature to 150° C. and performing gelatinization reaction for 17 min at normal pressure to obtain a dextrin crude material;

(3) adding deionized water into the dextrin crude material obtained in step (2), regulating sugar concentration to 42 wt %, and preserving heat to perform acidic hydrolysis for 1.5 h at 85° C. to obtain hydrolysate; and (4) adding activated carbon into the hydrolysate obtained in step (3) according to dry-base mass percent of 0.7%, preserving heat and stirring for 30 min, and then performing filtration to obtain feed liquid with light transmittance of 96%;

then regulating temperature of feed liquid before entering a column to 40° C. and pH of feed liquid exiting the column to 4.5 to obtain ion exchange liquid with electric conductivity of 90 μs/cm and light transmittance of 98%;

then performing sextuple-effect concentration to solid substance mass content of 55%; and performing chromatographic purification, secondary discoloration, secondary ion exchange, secondary concentration and belt vacuum drying to water mass content of 5% to obtain the resistant dextrin.

The chromatographic purification comprises regulating pH to 6.5 and then performing chromatographic purification through a chromatographic separation system, wherein operating conditions for chromatographic separation are as follows: operating pressure: 0.35 MPa, temperature: 70° C., water consumption ratio: 1:1.5 and feed per hour: 1.5 m$^3$;

the secondary discoloration comprises adding activated carbon according to dry-base mass percent of 0.7%, preserving heat and stirring for 30 min and then performing filtration;

the secondary ion exchange comprises the following step: regulating temperature of feed liquid before entering a column to 40° C. and pH of feed liquid exiting the column to 4.5 to obtain secondary ion exchange liquid with electric conductivity of 80 μs/cm and light transmittance of 99%;

the secondary concentration is sextuple-effect concentration to solid substance mass content of 58%, pH of 4.5, electric conductivity of 90 μs/cm and light transmittance of 99%; and according to the present invention, preferably, mass concentration of acid in step (1) and step (2) is 0.08%.

As tested, in the prepared resistant dextrin, the molar content of DP1 is 0.2%, the molar content of DP2 is 4.3%, the molar content of DP3 is 6.5%, the average degree of polymerization is 7, the pH value is 4.0 and the molar content of dietary fibers is 90%.

Example 3

A method for preparing a resistant dextrin comprises the following steps:

(1) adding hydrochloric acid solution into starch according to mass percent of 0.3% and uniformly stirring the mixture to obtain a reaction material;

(2) increasing temperature of the reaction material obtained in step (1) to 100° C., performing reaction for 3 h at normal pressure to obtain an initial reaction material, then adding hydrochloric acid solution according to mass percent of 6% relative to the initial reaction material, uniformly stirring the mixture, increasing temperature to 160° C. and performing gelatinization reaction for 22 min at normal pressure to obtain a dextrin crude material;

(3) adding deionized water into the dextrin crude material obtained in step (2), regulating sugar concentration to 43 wt %, and preserving heat to perform acidic hydrolysis for 1.5 h at 91° C. to obtain hydrolysate; and (4) adding activated carbon into the hydrolysate obtained in step (3) according to dry-base mass percent of 1.0%, preserving heat and stirring for 30 min, and then performing filtration to obtain feed liquid with light transmittance of 96%;

then regulating temperature of feed liquid before entering a column to 45° C. and pH of feed liquid exiting the column to 4.5 to obtain ion exchange liquid with electric conductivity smaller than 100 μs/cm and light transmittance greater than or equal to 98%;

then performing sextuple-effect concentration to solid substance mass content of 55%; and performing chromatographic purification, secondary discoloration, secondary ion exchange, secondary concentration and belt vacuum drying to water mass content of 5% to obtain the resistant dextrin.

The chromatographic purification comprised comprises regulating pH to 6.5 and then performing chromatographic purification through a chromatographic separation system, wherein operating conditions for chromatographic separation were are as follows: operating pressure: 0.3 MPa, temperature: 60° C., water consumption ratio: 1:1.3 and feed per hour: 1.4 m$^3$;

the secondary discoloration comprises adding activated carbon according to dry-base mass percent of 1%, preserving heat and stirring for 30 min and then performing filtration;

the secondary ion exchange comprises the following step:

regulating temperature of feed liquid before entering a column to 50° C. and pH of feed liquid exiting the column to 4.5 to obtain secondary ion exchange liquid with electric conductivity of 85 μs/cm and light transmittance of 99%;

the secondary concentration is sextuple-effect concentration to solid substance mass content of 60%, pH of 4.5, electric conductivity of 90 μs/cm and light transmittance of 99%; and mass concentration of acid in step (1) and step (2) is 0.12%.

As tested, in the prepared resistant dextrin, the molar content of DP1 is 0.5%, the molar content of DP2 is 4.1%, the molar content of DP3 is 6.0%, the average degree of polymerization is 9, the pH value is 3.5 and the molar content of dietary fibers is 86%.

Example 4

A method for preparing a resistant dextrin comprises the following steps:

(1) adding mixed solution of citric acid and malic acid at volume ratio of 1:1 into starch according to mass percent of 0.5% and uniformly stirring the mixture to obtain a reaction material;

(2) increasing temperature of the reaction material obtained in step (1) to 120° C., performing reaction for 2 h at normal pressure to obtain an initial reaction material, then adding mixed solution of citric acid and malic acid at volume ratio of 1:1 according to mass percent of 10% relative to the initial reaction material, uniformly stirring the mixture, increasing temperature to 200° C. and performing gelatinization reaction for 30 min at normal pressure to obtain a dextrin crude material;

(3) adding deionized water into the dextrin crude material obtained in step (2), regulating sugar concentration to 45 wt %, and preserving heat to perform acidic hydrolysis for 2 h at 100° C. to obtain hydrolysate; and (4) adding activated carbon into the hydrolysate obtained in step (3) according to dry-base mass percent of 1.5%, preserving heat and stirring for 35 min, and then performing filtration to obtain feed liquid with light transmittance of 95%;

then regulating temperature of feed liquid before entering a column to 55° C. and pH of feed liquid exiting the column to 5.0 to obtain ion exchange liquid with electric conductivity of 95 μs/cm and light transmittance of 98%;

then performing sextuple-effect concentration to solid substance mass content of 60%; and performing chromatographic purification, secondary discoloration, secondary ion exchange, secondary concentration and belt vacuum drying to water mass content of 6% to obtain the resistant dextrin.

The chromatographic purification comprises regulating pH to 7.0 and then performing chromatographic purification through a chromatographic separation system, wherein operating conditions for chromatographic separation are as follows: operating pressure: 0.25 MPa, temperature: 65° C., water consumption ratio: 1:1.4 and feed per hour: 1.3 m³;

the secondary discoloration comprises adding activated carbon according to dry-base mass percent of 1.5%, preserving heat and stirring for 35 min and then performing filtration;

the secondary ion exchange comprises the following step:

regulating temperature of feed liquid before entering a column to 55° C. and pH of feed liquid exiting the column to 5.0 to obtain secondary ion exchange liquid with electric conductivity of 95 μs/cm and light transmittance of 99%;

the secondary concentration is sextuple-effect concentration to solid substance mass content of 56%, pH of 5.0, electric conductivity of 95 μs/cm and light transmittance of 99%; and mass concentration of acid in step (1) and step (2) is 0.09%.

As tested, in the prepared resistant dextrin, the molar content of DP1 is 0.5%, the molar content of DP2 is 4.1%, the molar content of DP3 is 6.0%, the average degree of polymerization is 11, the pH value is 5.0 and the molar content of dietary fibers is 91%.

Example 5

A method for preparing a resistant dextrin comprises the following steps:

(1) adding phosphoric acid solution into starch according to mass percent of 0.1% and uniformly stirring the mixture to obtain a reaction material;

(2) increasing temperature of the reaction material obtained in step (1) to 80° C., performing reaction for 2 h at normal pressure to obtain an initial reaction material, then adding phosphoric acid solution according to mass percent of 1% relative to the initial reaction material, uniformly stirring the mixture, increasing temperature to 140° C. and performing gelatinization reaction for 15 min at normal pressure to obtain a dextrin crude material;

(3) adding deionized water into the dextrin crude material obtained in step (2), regulating sugar concentration to 40 wt %, and preserving heat to perform acidic hydrolysis for 1 h at 80° C. to obtain hydrolysate; and (4) adding activated carbon into the hydrolysate obtained in step (3) according to dry-base mass percent of 0.5%, preserving heat and stirring for 25 min, and then performing filtration to obtain feed liquid with light transmittance of 96%;

then regulating temperature of feed liquid before entering a column to 35° C. and pH of feed liquid exiting the column to 4.0 to obtain ion exchange liquid with electric conductivity of 80 μs/cm and light transmittance of 99%;

then performing sextuple-effect concentration to solid substance mass content of 50%; and performing chromatographic purification, secondary discoloration, secondary ion exchange, secondary concentration and belt vacuum drying to water mass content of 6% to obtain the resistant dextrin.

The chromatographic purification comprises regulating pH to 6.0 and then performing chromatographic purification through a chromatographic separation system, wherein operating conditions for chromatographic separation are as follows: operating pressure: 0.25 MPa, temperature: 55° C., water consumption ratio: 1:1.25 and feed per hour: 1.25 m³;

the secondary discoloration comprises adding activated carbon according to dry-base mass percent of 0.5%, preserving heat and stirring for 25 min and then performing filtration;

the secondary ion exchange comprises the following step:

regulating temperature of feed liquid before entering a column to 35° C. and pH of feed liquid exiting the column to 4.0 to obtain secondary ion exchange liquid with electric conductivity of 80 μs/cm and light transmittance of 99%;

the secondary concentration is sextuple-effect concentration to solid substance mass content of 53%, pH of 4.0, electric conductivity of 80 μs/cm and light transmittance of 99%; and mass concentration of acid in step (1) and step (2) is 0.11%.

As tested, in the prepared resistant dextrin, the molar content of DP1 is 1%, the molar content of DP2 is 4.5%, the molar content of DP3 is 7.0%, the average degree of polymerization is 6, the pH value is 3.5 and the content of dietary fibers is 89%.

Comparative Example 1

A Traditional Process for Preparing a Resistant Dextrin Comprises the Following Steps:

adding 0.05-0.5 wt % of hydrochloric acid solution into starch, performing uniform mixing, filtration, pre-drying, crushing by using a crusher, screening by using a 20-mesh to 60-mesh sieve, uniformly mixing edible oil with the pre-dried starch, then adding the mixture into a reaction container, increasing temperature to 150-250° C. to perform acid-hot reaction for 10-120 min, obtaining an indigestible dextrin crude product after reaction and performing refining treatment to the indigestible dextrin crude product to obtain an indigestible dextrin product.

Mass concentration of the hydrochloric acid is 0.1%.

Temperature for the pre-drying is 80-110° C. and the pre-drying is performed till water content is less than 5 wt %.

The edible oil is edible soybean oil.

Weight of the added edible oil is 10-20% of weight of the starch.

Comparative Example 2

A method for preparing a resistant dextrin comprises the following steps:

(1) adding hydrochloric acid solution into starch according to mass percent of 6.3%, uniformly stirring the mixture, increasing temperature to 160° C., and performing gelatinization reaction for 3 h and 22 min at normal pressure to obtain a dextrin crude material; and uniformly stirring the dextrin crude material to obtain a reaction material;

(2) adding deionized water into the dextrin crude material obtained in step (1) regulating sugar concentration to 43 wt %, and preserving heat to perform acidic hydrolysis for 1.5 h at 91° C. to obtain hydrolysate; and (3) adding activated carbon into the hydrolysate obtained in step (2) according to dry-base mass percent of 1.0%, preserving heat and stirring for 30 min, and then performing filtration to obtain feed liquid with light transmittance of 96%;

then regulating temperature of feed liquid before entering a column to 45° C. and pH of feed liquid exiting the column to 4.5 to obtain ion exchange liquid with electric conductivity smaller than 100 μs/cm and light transmittance greater than or equal to 98%;

then performing sextuple-effect concentration to solid substance mass content of 55%; and performing chromatographic purification, secondary discoloration, secondary ion exchange, secondary concentration and belt vacuum drying to water mass content of 5% to obtain the resistant dextrin.

The chromatographic purification comprises regulating pH to 6.5 and then performing chromatographic purification through a chromatographic separation system, wherein operating conditions for chromatographic separation are as follows: operating pressure: 0.25 MPa, temperature: 55° C., water consumption ratio: 1:1.25 and feed per hour: 1.25 m³;

the secondary discoloration comprises adding activated carbon according to dry-base mass percent of 1%, preserving heat and stirring for 30 min and then performing filtration;

the secondary ion exchange comprises the following step:

regulating temperature of feed liquid before entering a column to 50° C. and pH of feed liquid exiting the column to 4.5 to obtain secondary ion exchange liquid with electric conductivity of 85 μs/cm and light transmittance of 99%;

the secondary concentration is sextuple-effect concentration to solid substance mass content of 55%, pH of 4.5, electric conductivity of 90 μs/cm and light transmittance of 99%; and mass concentration of acid in step (1) and step (2) is 0.1%.

As tested, in the prepared resistant dextrin, the molar content of DP1 is 2.5%, the molar content of DP2 is 8.1%, the molar content of DP3 is 12.0%, the average degree of polymerization is 15, the pH value is 3.5 and the molar content of dietary fibers is 62%.

Application Example 1

After the Products Prepared in Comparative Example 1 and Comparative Example 2 and the Product Prepared in Example 3 were Tested, Product Indexes were Compared as Follow:

Content of dietary fibers was tested according to the national standard Determination of Dietary Fibers in Food (GB/T 5009.88-2008).

TABLE 1

| | DP1 | DP2 | DP3 | Average degree of polymerization | Content of dietary fibers |
| --- | --- | --- | --- | --- | --- |
| Comparative example 1 | 3.2% | 8.5% | 15.0% | 21 | 58% |
| Comparative example 2 | 2.5% | 8.1% | 12% | 15 | 62 |
| Example 3 | 0.5% | 4.1% | 6.0% | 9 | 86% |

From the above-mentioned comparison, it can be seen that the content of DP1-DP3 in the resistant dextrin prepared in Example 3 is much lower than the content of DP1-DP3 in the comparative examples, the average degree of polymerization is low, it indicates that the reaction is more complete, the separation quantity distribution is more uniform, the content of dietary fibers is higher at the same time and the product performance advantage is obvious.

The applicability of the products prepared in comparative example 1 and comparative example 2 and the applicability of the product prepared in Example 3 were compared as follow:

The resistant dextrin product in Example embodiment 3 and the products prepared in comparative example 1 and comparative example 2 were compared, the product flowability was evaluated by adopting an angle-of-repose index, and the angle of repose refers to an included angle between a sloping side of the most slope stack formed by powder or particles and a horizontal plane, and the flowability is usually represented by using angle of repose, the smaller the angle of repose is, the better the flowability is, and otherwise, the flowability is poorer.

Hygroscopicity (moisture absorption rate) was calculated by adopting the following formula:

Moisture absorption rate=(mass of sample after moisture absorption−mass of absolute dry sample)/mass of absolute sample Test results are shown in Table 2:

TABLE 2

|  | Product taste | Flowability (angle of repose) | Solubility | Hygroscopicity (moisture absorption rate) |
|---|---|---|---|---|
| Example 3 | No bitterness | 22° | Immediately soluble in water, short dissolution time, no insoluble substance | 31% |
| Comparative example 1 | Bitterness | 66° | Not easily soluble, longer dissolution time, no insoluble substance | 65% |
| Comparative example 2 | Bitterness | 62° | Not easily soluble, longer dissolution time, no insoluble substance | 72% |

From the above-mentioned data, it can be seen that, for comparative example 1 and comparative example 2, since DP1, DP2 and DP3 do not respectively satisfy the requirements that the molar content of DP1 is smaller than or equal to 1%, the molar content of DP2 is smaller than or equal to 4.5% and the molar content of DP3 is smaller than or equal to 7.0%, and the average degree of polymerization does not satisfy the requirement of 6-12, the taste, flowability, solubility, hygroscopicity and the like are obviously poorer than that of the product prepared in Example 3.

Comparative Example 3

A resistant dextrin was prepared according to a method recorded in embodiment 1 of Chinese patent literature CN104403009A (Application No.: 201410671093.0). As detect tested, in the prepared resistant dextrin, the molar content of DP1 is 3.0%, the molar content of DP2 is 7.5%, the molar content of DP3 is 14.0%, the average degree of polymerization is 20, the pH value is 4.2 and the molar content of dietary fibers is 84.6%.

Application Example 2

After the Product Prepared in Comparative Example 3 and the Products Prepared in Example 1 and Example 2 were Tested, Product Indexes were Compared as Follow:

Content of dietary fibers was tested according to the national standard Determination of Dietary Fibers in Food (GB/T 5009.88-2008).

TABLE 1

|  | DP1 | DP2 | DP3 | Average degree of polymerization | Content of dietary fibers |
|---|---|---|---|---|---|
| Comparative example 3 | 3.0% | 7.5% | 14.0% | 20 | 84.6% |
| Example 1 | 0.3% | 4.1% | 6% | 7 | 88% |
| Example 2 | 0.2% | 4.3% | 6.5% | 7 | 90% |

From the above-mentioned comparison, it can be seen that the content of DP1-DP3 in the resistant dextrin prepared in Example 1 and Example 2 is much lower than the content of DP1-DP3 in the comparative example 3, the average degree of polymerization is low, which indicates that the reaction is more complete, the separation quantity distribution is more uniform, the content of dietary fibers is higher at the same time and the product performance advantage is obvious.

The Applicability of the Product Prepared in Comparative Example 3 and the Applicability of the Products Prepared in Example 1 and Example 3 were Compared as Follow:

The resistant dextrin products in Example 1 and Example 2 and the product prepared in comparative example 3 were compared, the product flowability was evaluated by adopting an angle-of-repose index, and the angle of repose refers to an included angle between a sloping side of the most slope stack formed by powder or particles and a horizontal plane, and the flowability is usually represented by using angle of repose, the smaller the angle of repose is, the better the flowability is, and otherwise, the flowability is poorer.

Hygroscopicity (moisture absorption rate) was calculated by adopting the following formula:

Moisture absorption rate=(mass of sample after moisture absorption−mass of absolute dry sample)/mass of absolute sample Test results are shown in Table 2:

TABLE 2

|  | Product taste | Flowability (angle of repose) | Solubility | Hygroscopicity (moisture absorption rate) |
|---|---|---|---|---|
| Example 1 | No bitterness | 22° | Immediately soluble in water, short dissolution time, no insoluble substance | 31% |

TABLE 2-continued

|  | Product taste | Flowability (angle of repose) | Solubility | Hygroscopicity (moisture absorption rate) |
|---|---|---|---|---|
| Example 2 | No bitterness | 22° | Immediately soluble in water, short dissolution time, no insoluble substance | 30% |
| Comparative example 3 | Bitterness | 60° | Not easily soluble, longer dissolution time, no insoluble substance | 75% |

From the above-mentioned data, it can be seen that, for comparative example 3, since DP1, DP2 and DP3 do not respectively satisfy the requirements that the molar content of DP1 is smaller than or equal to 1%, the molar content of DP2 is smaller than or equal to 4.5% and the molar content of DP3 is smaller than or equal to 7.0%, and the average degree of polymerization does not satisfy the requirement of 6-12, the taste, flowability, solubility, hygroscopicity and the like are obviously poorer than those of the products prepared in Example 1 and Example 2.

What is claimed is:

1. A method for preparing a resistant dextrin, characterized in that the method comprises the following steps:
    (1) adding hydrochloric acid solution into starch according to mass percent of 0.3% and uniformly stirring the mixture to obtain a reaction material;
    (2) increasing temperature of the reaction material obtained in step (1) to 80-120° C., performing reaction for 2-4 h at normal pressure to obtain an initial reaction material, then adding hydrochloric acid solution according to mass percent of 6% relative to the initial reaction material, uniformly stirring the mixture, increasing temperature to 140-200° C. and performing gelatinization reaction for 15-30 min at normal pressure to obtain a dextrin crude material;
    (3) adding deionized water into the dextrin crude material obtained in step (2), regulating sugar concentration to 40-45 wt %, and preserving heat to perform acidic hydrolysis to 1-2 h at 80-100° C. to obtain hydrolysate; and
    (4) performing discoloration, on exchange, concentration, purification and drying to the hydrolysate obtained in step (3) to obtain the resistant dextrin;
    wherein the hydrochloric acid solution in step (1) and step (2) have a mass concentration of 0.12%;
    the ion exchange is performed by using an ion exchange column to obtain ion exchange liquid with electric conductivity smaller than 100 μ/cm and light transmittance greater than or equal to 98%; and wherein the resistant dextrin has
    a molar content of DP1 being smaller than or equal to 1%;
    a molar content of DP2 being smaller than or equal to 4.5%;
    a molar content of DP3 being smaller than or equal to 7.0%;
    an average degree of polymerization of 6-12;
    a pH value of 3.0-6.0; and
    a molar content of dietary fibers being greater than or equal to 85%.
2. The method according to claim 1, characterized in that the discoloration in step (4) comprises the following step:
    adding activated carbon according to dry-base mass percent of 0.5-1.5%, preserving heat and stirring for 25-35 min, and then performing filtration to obtain a feed liquid with light transmittance greater than or equal to 95%.
3. The method according to claim 1, characterized in that the ion exchange in step (4) comprises the following step:
    regulating temperature of the feed liquid before entering an ion exchange column to 35-55° C. and pH of the feed liquid exiting the ion exchange column to 4.0-5.0 to obtain ion exchange liquid with electric conductivity smaller than 100 μs/cm and light transmittance greater than or equal to 98%.
4. The method according to claim 1, characterized in that the concentration in step (4) is sextuple-effect concentration to solid substance mass content of 50-60%.
5. The method according to claim 1, characterized in that the purification in step (4) comprises chromatographic purification, secondary discoloration, secondary ion exchange and secondary concentration.
6. The method according to claim 5, characterized in that the chromatographic purification comprises regulating pH to 6.0-7.0 and then performing chromatographic purification through a chromatographic separation system, wherein operating conditions for chromatographic separation are as follows: operation pressure: 0.2-0.35 MPa, temperature: 50-70° C., water consumption ratio: 1:(1.2-1.5) and feed per hour: 1.2-1.5 m$^3$.
7. The method according to claim 1, characterized in that the secondary discoloration comprises adding activated carbon according to dry-base mass percent of 0.5-1.5%, preserving heat and stirring for 25-35 min and then performing filtration.
8. The method according to claim 5, characterized in that the secondary ion exchange comprises the following step:
    regulating temperature of the feed liquid before entering a column to 35-55° C. and pH of the feed liquid exiting the column to 4.0-5.0 to obtain secondary ion exchange liquid with electric conductivity smaller than 100 μs/cm and light transmittance greater than or equal to 98%.
9. The method according to claim 5, characterized in that the secondary concentration is sextuple-effect concentration to solid substance mass content of 50-60%, pH of 4.0-5.0%, electric conductivity smaller than 100 μs/cm and light transmittance greater than or equal to 98%.
10. The method according to claim 1, characterized in that the drying in step (4) is belt vacuum drying to water mass content smaller than or equal to 6%.
11. The method according to claim 1, wherein steps (1)-(4) are characterized in that:
    (1) adding hydrochloric acid solution into starch according to mass percent of 0.3% and uniformly stirring the mixture to obtain a reaction material;
    (2) increasing temperature of the reaction material obtained in step (1) to 100° C., performing reaction for 3 h at normal pressure to obtain an initial reaction material, then adding hydrochloric acid solution according to mass percent of 6% relative to the initial reaction material, uniformly stirring the mixture, increasing temperature to 160° C. and performing gelatinization reaction for 22 min at normal pressure to obtain a dextrin crude material;

(3) adding deionized water into the dextrin crude material obtained in step (2), regulating sugar concentration to 43 wt %, and preserving heat to perform acidic hydrolysis for 1.5 h at 91° C. to obtain hydrolysate; and (4) performing discoloration, ion exchange, concentration, purification and drying to the hydrolysate obtained in step (3) to obtain the resistant dextrin.

12. A method for preparing a resistant dextrin comprises the following steps:

(1) adding hydrochloric acid solution into starch according to mass percent of 0.3% and uniformly stirring the mixture to obtain a reaction material;

(2) increasing temperature of the reaction material obtained in step (1) to 100° C., performing reaction for 3 h at normal pressure to obtain an initial reaction material, then adding hydrochloric acid solution according to mass percent of 6% relative to the initial reaction material, uniformly stirring the mixture, increasing temperature to 160° C. and performing gelatinization reaction for 22 min at normal pressure to obtain a dextrin crude material;

(3) adding deionized water into the dextrin crude material obtained in step (2), regulating sugar concentration to 43 wt %, and preserving heat to perform acidic hydrolysis for 1.5 h at 91° C. to obtain hydrolysate; and (4) adding activated carbon into the hydrolysate obtained in step (3) according to dry-base mass percent of 1.0%, preserving heat and stirring for 30 min, and then performing filtration to obtain feed liquid with light transmittance of 96%;

then regulating temperature of feed liquid before entering a column to 45° C. and pH of feed liquid exiting the column to 4.5 to obtain ion exchange liquid with electric conductivity smaller than 100 μs/cm and light transmittance greater than or equal to 98%;

then performing sextuple-effect concentration to solid substance mass content of 55%; and performing chromatographic purification, secondary discoloration, secondary ion exchange, secondary concentration and belt vacuum drying to water mass content of 5% to obtain the resistant dextrin;

wherein the hydrochloric acid solution in step (1) and step (2) have a mass concentration of 0.12%.

* * * * *